United States Patent
Cancade et al.

(10) Patent No.: US 7,370,675 B2
(45) Date of Patent: May 13, 2008

(54) FLOW CONDITIONER FOR A FLUID TRANSPORT PIPE

(75) Inventors: Julien Cancade, Alfortville (FR); Jean-Luc Beccat, Paris (FR)

(73) Assignee: Gaz de France, Paris (FR)

( * ) Notice: Subject to any disclaimer, the term of this patent is extended or adjusted under 35 U.S.C. 154(b) by 448 days.

(21) Appl. No.: 11/054,697

(22) Filed: Feb. 9, 2005

(65) Prior Publication Data

US 2005/0178455 A1 Aug. 18, 2005

(30) Foreign Application Priority Data

Feb. 17, 2004 (FR) .................................. 04 01558

(51) Int. Cl.
*F15D 1/02* (2006.01)
*B01F 5/06* (2006.01)

(52) U.S. Cl. ............................ 138/45; 138/46; 138/44; 138/41; 137/601.18; 137/547; 137/550; 251/65

(58) Field of Classification Search .................. 138/44, 138/45, 46; 137/504, 601.18, 599.14, 599.15, 137/547, 550, 601.2; 251/65
See application file for complete search history.

(56) References Cited

U.S. PATENT DOCUMENTS

| | | | |
|---|---|---|---|
| 3,050,086 A * | 8/1962 | Honsinger | 138/45 |
| 4,244,526 A * | 1/1981 | Arth | 239/533.1 |
| 4,743,365 A * | 5/1988 | Noland | 210/106 |
| 4,770,212 A * | 9/1988 | Wienck | 138/45 |
| 5,148,830 A * | 9/1992 | Liu | 137/513.7 |
| 5,341,848 A * | 8/1994 | Laws | 138/44 |
| 5,373,873 A * | 12/1994 | Miller et al. | 141/18 |
| 5,495,872 A * | 3/1996 | Gallagher et al. | 138/44 |
| 5,529,093 A * | 6/1996 | Gallagher et al. | 138/44 |
| 6,145,544 A | 11/2000 | Dutertre et al. | 138/39 |
| 6,186,179 B1 * | 2/2001 | Hill | 138/39 |
| 2006/0081292 A1* | 4/2006 | Sarno et al. | 137/527 |

FOREIGN PATENT DOCUMENTS

| | | |
|---|---|---|
| FR | 2319072 | 2/1977 |
| FR | 2566092 | 12/1985 |
| FR | 2776033 A | 9/1999 |

* cited by examiner

Primary Examiner—Patrick F. Brinson
(74) Attorney, Agent, or Firm—Weingarten, Schurgin, Gagnebin & Lebovici LLP (57) ABSTRACT

The flow conditioner for a fluid transport pipe, comprises a support-forming substantially tubular main body, at least one flow rectifier disposed inside the main body essentially perpendicularly to the axis XX' thereof, and a porous plate disposed inside the main body upstream from the flow rectifier and parallel thereto. The elements of the conditioner are disposed in such a manner that a substantial fraction of the fluid flow passes through the flow rectifier and the porous plate in the absence of the porous plate becoming clogged. A bypass circuit is provided to ensure fluid flow continuity in the event of the porous plate becoming clogged.

13 Claims, 4 Drawing Sheets

FLOW CONDITIONER FOR A FLUID TRANSPORT PIPE

This application claims priority to a French application No. 04 01558 filed Feb. 17, 2004.

BACKGROUND OF THE INVENTION

The present invention relates to the general field of flow conditions for fluid transport pipes. It relates more particularly to a flow conditioner for a gas transport pipe, the conditioner including at least one flow rectifier associated with a porous plate located upstream from the flow rectifier.

The spinner gas volume meters that are installed in delivery stations are sensitive to conditions of use. In particular, when such meters are installed downstream from expanders or from obstacles such as valves, bends, double bends, constrictions, T-junctions, or other non-rectilinear elements, their accuracy can be affected by the disturbances generated by such obstacles.

In order to eliminate those disturbances, it is known to provide spinner meters with flow conditioners. Such equipment serves to attenuate the flow disturbances such as rotation of the gas stream, known as "swirl", jet effects, or acoustic pulses, over distances that are short compared with the very long straight lines that are normally needed for natural attenuation.

Numerous types of flow conditioner exist that are capable of reducing the swirl of the gas stream. Such conditioners essentially comprise a perforated plate having a set of holes distributed in a plurality of concentric rings centered on the center of the perforated plate.

Nevertheless, very few conditioners reduce in satisfactory manner the swirl of the gas stream, its asymmetry, and the pulses in the flow. They are designed to be used with straight line lengths upstream and downstream that correspond to several times the nominal diameter of the pipe, which makes them of limited usefulness when it is desired to make compact expander and metering stations.

Furthermore, in order to make disturbances while reducing the size of such stations, the Applicant has proposed a flow conditioner as described in French patent application FR 2 776 033. In one of the embodiments, the conditioner comprises a perforated plate and a porous plate that is placed upstream from the perforated plate and that is put into contact therewith so that all of the gas flow passes through both elements. The presence of a porous plate in the conditioner is particularly advantageous since it makes it possible significantly to improve the homogenizing ability of the perforated plate on the flow.

Nevertheless, there exists a risk of the porous plate in such a flow conditioner becoming clogged, which would lead to a large increase in head loss, and above all to an interruption in gas feed continuity. Such clogging could arise in exceptional manner, in particular when the impurities present in the gas close up the pores in the porous plate.

OBJECT AND SUMMARY OF THE INVENTION

The present invention thus seeks to mitigate such drawbacks by proposing a compact flow conditioner which enables all flow disturbances to be eliminated effectively, while avoiding any risk of interrupting continuity in fluid feed.

To this end, the invention provides a flow conditioner for a fluid transport pipe, the conditioner comprising a substantially tubular main body forming a support, at least one flow rectifier disposed inside the main body essentially perpendicularly to its axis XX', and a porous plate disposed inside the main body upstream from the flow rectifier and parallel thereto, wherein the elements of the conditioner are disposed in such a manner that a substantial fraction of the fluid flow passes through the flow rectifier and the porous plate in the absence of the porous plate becoming clogged, and wherein the conditioner further includes a bypass circuit for ensuring continuity of fluid flow in the event of said porous plate becoming clogged.

More particularly, a stationary element and a moving element are disposed inside the main body, the moving element being in contact with the stationary element in the absence of the porous plate becoming clogged, and being suitable for being moved in axial translation in a downstream direction relative to the stationary elements so as to release a bypass passage for the fluid in the event of said porous plate becoming clogged.

Preferably, the conditioner further includes means for holding the moving element in contact with the stationary element in the absence of the porous plate becoming clogged, and means for allowing the moving element to move in translation relative to the stationary element in the event of said porous plate becoming clogged.

As a result, under normal conditions of use, a substantial fraction of the fluid flow passes through the flow rectifier and the porous plate, thus serving significantly to attenuate the disturbances in the flow downstream. In the event of the porous plate becoming clogged, the bypass circuit allows continuity of fluid flow to be ensured by providing a bypass passage for the fluid.

In an embodiment of the invention, the moving element is a support ring for supporting the porous plate, having an outside diameter smaller than an inside diameter of the main body, and the stationary element is a ring disposed inside the main body upstream from the porous plate, parallel thereto, and having an inside diameter smaller than the outside diameter of the moving ring.

Advantageously, the conditioner includes means for producing a magnetic attraction force to hold the moving ring against the stationary ring. This magnetic attraction force can be obtained by means of at least one permanent magnet or at least one electromagnet secured to the stationary ring, the moving ring being made essentially out of at least one ferromagnetic material.

Still advantageously, the moving ring includes at least one guide rod extending axially upstream and co-operating with a corresponding hole formed through the stationary ring so as to allow the moving ring to move in axial translation relative to the stationary ring.

Preferably, each guide rod is provided with an adjustable abutment element for coming into abutment against an upstream face of the stationary ring.

In another embodiment of the invention, the stationary element is constituted by the porous plate having an outside diameter less than an inside diameter of the main body, and the moving element is a ring disposed around the porous plate between the outside diameter of the porous plate and the inside diameter of the main body.

The flow rectifier may include at least one guide rod extending axially upstream and co-operating with a corresponding hole formed through the moving ring so as to allow said moving ring to move in axial translation relative to the porous plate.

Each guide rod may be provided with a spring interposed between the flow rectifier and the moving ring so as to hold said moving ring around the porous plate.

Preferably, the moving ring includes at least one adjustable abutment element for holding the bypass passage open in the event of the porous plate becoming clogged. This makes it possible to avoid a phenomenon of self-sustained oscillations in the moving ring which would have a harmful effect on the quality of metering.

According to an advantageous characteristic of the invention, the porous plate presents a thickness of about 10 millimeters (mm) and is made of a nickel-chromium alloy.

The distance between the flow rectifier and the porous plate in the absence of the porous plate becoming clogged lies in the range 5 mm to 25 mm, approximately.

The flow rectifier may be a perforated plate and the fluid may be a gaseous fluid.

BRIEF DESCRIPTION OF THE DRAWINGS

Other characteristics and advantages of the present invention appear from the description given below with reference to the accompanying drawings which show an embodiment that has no limiting character. In the figures.

DETAILED DESCRIPTION OF AN EMBODIMENT

In the figures, the flow conditioner 2, 2' is for use in gas transport pipes. In general, the present invention applies to flow conditioners for pipes for transporting any type of fluid.

The flow conditioner 2, 2' essentially comprises a tubular main body 4 of axis XX' constituting a support. At its downstream end, the main body 4 has a flange 6 enabling it to be secured to a gas transport pipe (not shown). The main body 4 is disposed inside the pipe so that its axis XX' coincides with the axis of the pipe.

The conditioner 2, 2' also comprises at least one flow rectifier 8 disposed inside the main body 4 essentially perpendicularly to its axis XX', and a porous plate 10 disposed inside the main body 4 upstream from the flow rectifier 8 and parallel thereto.

As shown in the figures, the flow rectifier may be a perforated plate 8 held securely to the inside of the main body 4. For example it may be formed integrally with the main body 4. It further includes openings of distribution and dimensions that are optimized so as to contribute to attenuating disturbances in the gas flow. For example it may have a central hole 12 and a set of holes 12' that are distributed over a plurality of concentric rings centered on the axis XX' of the main body 4.

Alternatively, the flow rectifier may be of the type having fins or a bundle of tubes.

The porous plate 10 is positioned inside the main body 4 so that a significant portion (or even all) of the gas flow passes through the porous plate and the perforated plate 8 when the porous plate is not clogged. The porous plate 10 enables the effectiveness of the flow conditioner to be improved by contributing to eliminating asymmetries and by attenuating high levels of turbulence. It presents excellent homogenizing power on the flow while destroying large turbulent structures.

Preferably, the porous material used is a nickel chromium alloy. The mean diameter of the pores may advantageously be about 0.9 mm with a contact area with the flow (or a specific surface area) of the order of 1700 square meters per cubic meter ($m^2/m^3$) and thickness of about 10 mm.

The flow conditioner further comprises a bypass circuit so as to ensure continuity of gas flow in the event of the porous circuit becoming clogged. The porous plate is said to be clogged when its pores are blocked (at least in part) by impurities coming from the gas to such an extent that its head loss increases greatly.

The bypass circuit comprises a stationary element and a moving element disposed inside the main body, the moving element being in contact with the stationary element in the absence of the porous plate being clogged and being suitable for moving axially in translation downstream relative to the stationary element so as to release a bypass passage for the gas in the event of said porous plate becoming clogged.

The bypass circuit further comprises means for keeping the moving element in contact with the stationary element in the absence of the porous plate becoming clogged, and means for moving the moving element in translation relative to the stationary element so as to enable said moving element to be displaced in the event of the porous plate becoming clogged.

Two embodiments of the flow conditioner bypass circuit of the invention are described below.

Figure 1:
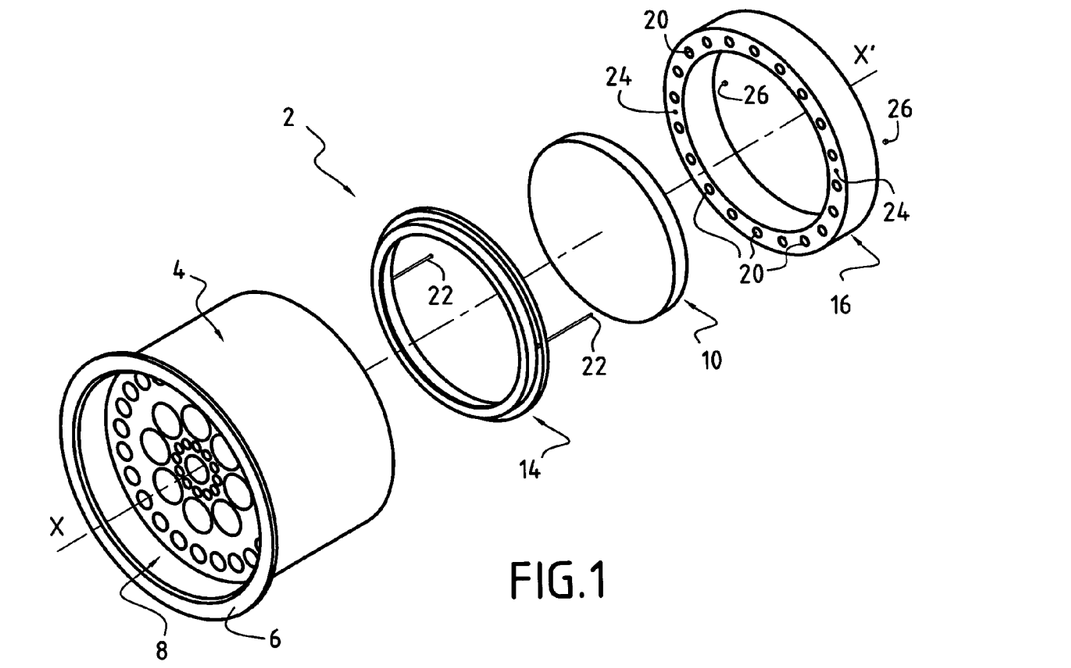
FIG. 1 is an exploded perspective view of a flow conditioner in an embodiment of the invention.
Figure 2A:
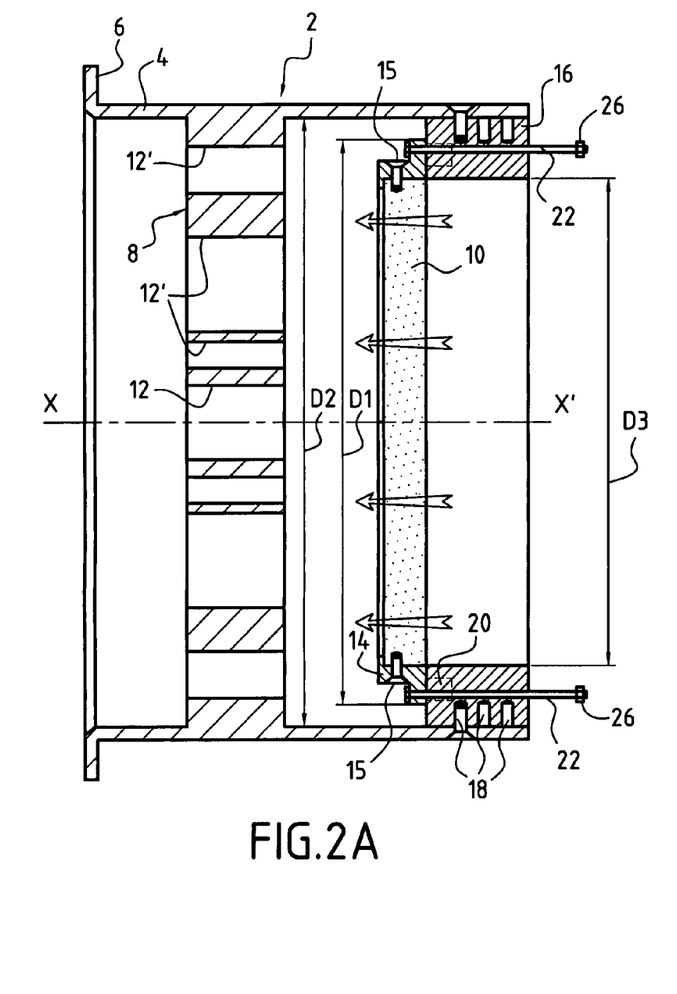
FIGS. 2A and 2B are axial section views of the FIG. 1 conditioner in two different conditions of use.
Figure 2B:
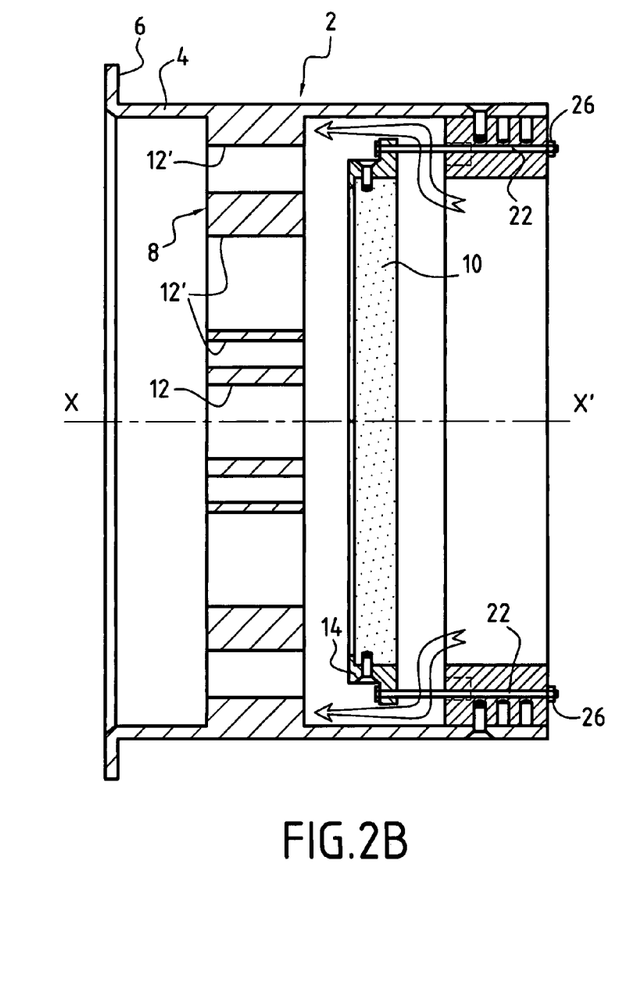

In an embodiment shown in FIGS. 1, 2A, and 2B, the moving element of the bypass circuit is a ring 14 for supporting the porous plate 10, having an outside diameter D1 less than an inside diameter D2 of the main body. By way of example, the porous plate is fastened onto the moving ring 14 by means of setscrews 15.

The, stationary element of the bypass circuit is a ring 16 placed inside the main body 4 upstream from the porous plate 10 and parallel thereto, defining an inside diameter D3 that is smaller than the outside diameter D1 of the moving ring 14. The stationary ring 16 is secured to the main body 4 via clamping screws 18.

The stationary ring 16 has at least one permanent magnet 20 for producing a magnetic force of attraction to hold the moving ring 14 in place in the absence of the porous plate 10 becoming clogged. For this purpose, the moving ring 14 essentially comprises at least one ferromagnetic element selected, for example, from the following elements: iron, nickel, and cobalt.

Preferably, the stationary ring 16 has a plurality of permanent magnets 20, e.g. made of samarium-cobalt alloy that are regularly distributed around its entire circumference. For example, such magnets may present a diameter of 8 mm and a length of 20 mm, with a unit bearing force of about 2.2 kilograms (kg).

Alternatively, when the nature of the fluid makes this possible, the magnetic attractive force for holding the moving ring 14 in the absence of the porous plate 10 becoming clogged may be obtained by at least one electromagnet (not shown) fastened to the stationary ring 16. In which case, the moving ring 14 is likewise essentially constituted by at least one ferromagnetic element.

The moving ring 14 has at least one guide rod 22 extending axially upstream and co-operating with a corresponding hole 24 formed through the stationary ring so as to allow the moving ring to move in axial translation relative to the stationary ring. In FIGS. 1, 2A, and 2B, the moving ring 14 preferably comprises two guide rods 22 that are diametrically opposite. These guide rods may be welded to the moving ring 14, for example.

Advantageously, each of the guide rods 22 is provided with an adjustable element 26 constituting an abutment with an upstream face of the stationary ring 16.

The conditioner described above operates in a manner that stems obviously from the above.

Under normal conditions of use (FIG. 2A), i.e. in the absence of the porous plate 10 being clogged, the moving ring 14 is held against the stationary ring 16 by the magnetic force of attraction exerted by the magnets 20. In this configuration, the entire gas flow coming from the pipe passes through the porous plate 10 and then the perforated plate 8.

In the event of the porous material used to constitute the porous plate 10 becoming clogged (FIG. 2B), the head loss in the gas flow increases so the pressure applied by the gas flow on the porous plate 10 also increases. When this pressure overcomes the retaining force of the magnets 20, the porous plate 10 is subjected to movement in translation in the downstream direction under the thrust of the gas with the guide rod 22 sliding in the hole 24 until the adjustable element 26 come into abutment against the upstream face of the stationary ring 16. A bypass passage is thus opened for the gas between the stationary ring 16 and the moving ring 14, thus enabling gas to continue being delivered.

In the normal-use configuration of the conditioner, it can be seen that it is possible to adjust the distance between the perforated plate 8 and the porous plate 10. By way of example, this distance can lie in the range 5 mm to 25 mm, and is preferably about 10 mm.

When in the porous material clogged configuration, it is also possible to adjust this distance between the perforated plate and the porous plate 10, in particular by adjusting the abutment elements 26.

In addition, the force containing the moving ring 14 against the stationary ring 16 can be adjusted as a function of the number of magnets 20 installed on the stationary ring. This adjustment takes place depending on the diameter of the pipe in which the conditioner is mounted and depending on the amount of clogging of the porous material that can be tolerated.

It should also be observed that an intermediate mode of operation for the conditioner 2 can be envisaged. In such a mode of operation (not shown in the figures), the support ring of the porous plate is stationary relative to the stationary ring and it is held at a certain distance apart therefrom, e.g. by means of an abutment interposed between the moving and stationary rings. The presence of permanent magnets in the stationary ring is not essential. In this configuration, the bypass circuit is thus permanently open. As a result, in the absence of the porous material being clogged, a substantial fraction of the fluid flow passes through the porous plate while the remainder flows via the bypass circuit. In the event of the porous material becoming clogged, all of the fluid flow flows via the bypass circuit so as to ensure continuity in the fluid flow.

Figure 3:
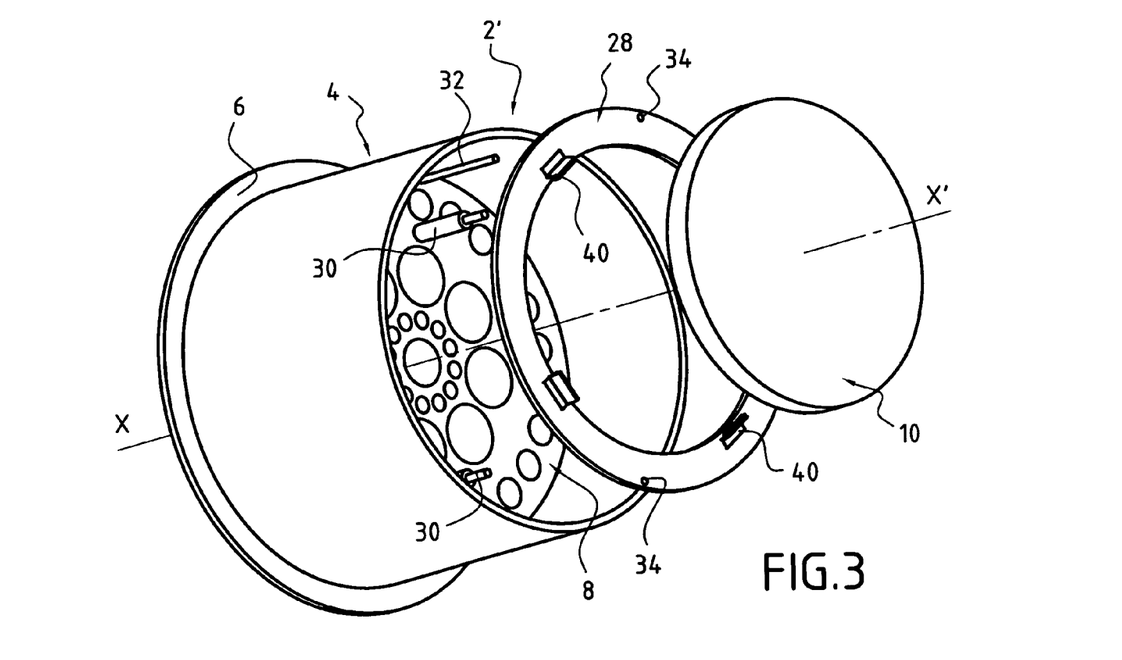
FIG. 3 is an exploded perspective view of a conditioner constituting another embodiment of the invention.
Figure 4A:
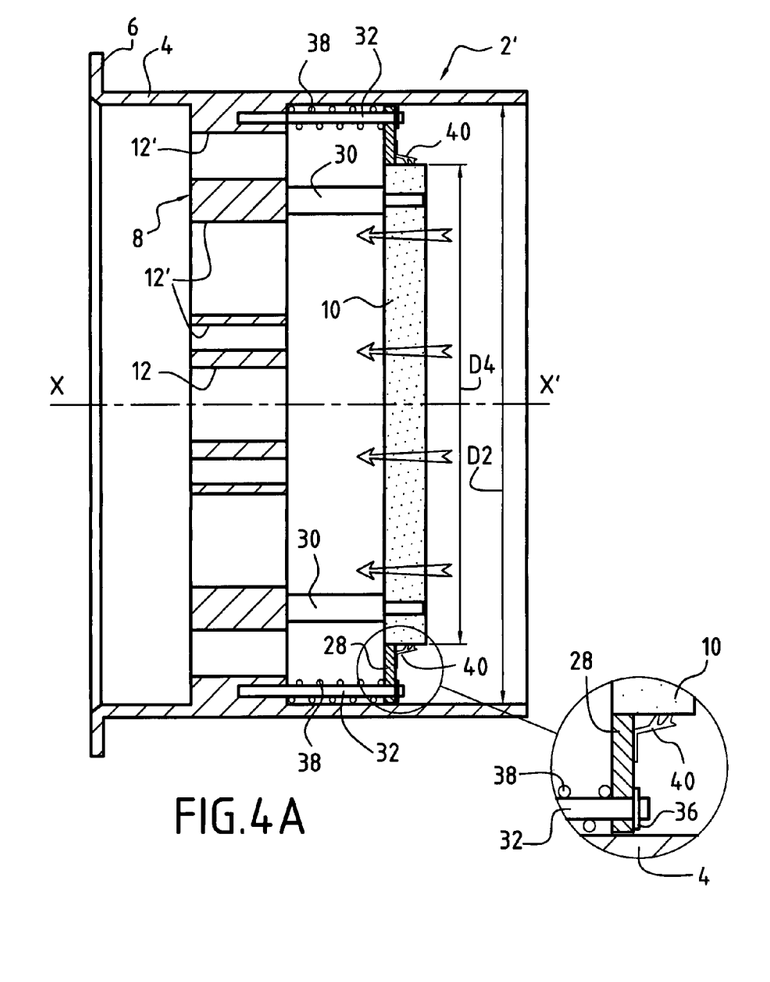
FIGS. 4A and 4B are axial section views of the FIG. 3 conditioner in two different conditions of use.
Figure 4B:
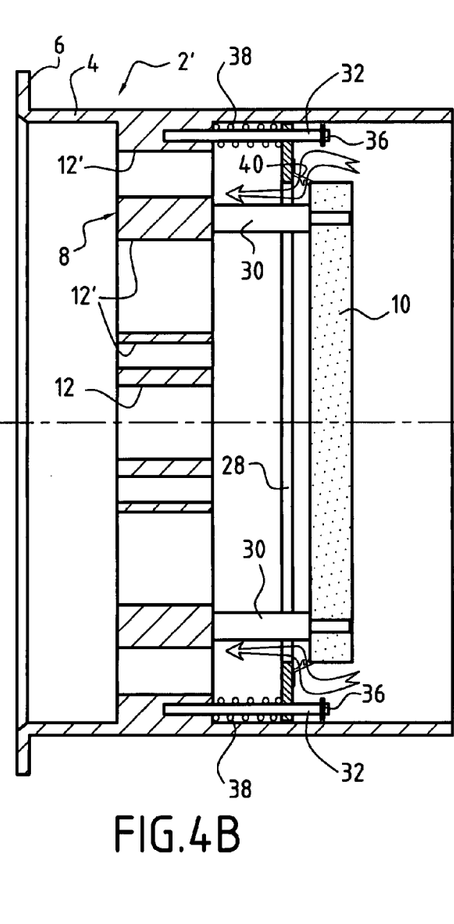

In another embodiment of the conditioner 2' as shown in FIGS. 3, 4A, and 4B, the stationary element of the bypass circuit is constituted by a porous plate 10 of outside diameter D4 that is smaller than the inside diameter of the main body 4, while the moving element is a ring 28 disposed around the porous plate 10, between the outside diameter D4 of the porous plate and the inside diameter D2 of the main body 4.

By way of example, the porous plate 10 is fastened to the perforated plate 8 via fastener rods 30 extending upstream parallel to the axis XX' of the main body 4.

The perforated plate 8 has at least one guide rod 32 extending axially upstream and co-operating with a corresponding hole 34 formed through the moving ring 28 so as to allow it to move axially relative to the porous plate 10. In FIGS. 4A and 4B, the perforated plate 8 preferably has two guide rods 32 that are diametrically opposite. By way of example, these guide rods can be welded to the perforated plate 8.

Each guide rod 32 has a washer or nut type element 36 at its end serving to act as an abutment against an upstream face of the moving ring 28.

Advantageously, each guide rod 22 is also provided with a spring 38 interposed between the perforated plate 8 and the moving ring 28 so as to hold the moving ring around the porous plate 10 in the absence of the porous plate being clogged.

The conditioner as described above operates in a manner that stems from the above description.

Under conditions of normal use (FIG. 4A), i.e. when the porous plate 10 is not clogged, the moving ring 28 is held around the porous plate by springs 38 fitted to each guide rod 32. In this configuration, the entire gas flow coming from the pipe passes through the porous plate 10 and then through the perforated plate 8.

In the event of the porous material used for the porous plate 10 becoming clogged (FIG. 4B), the head loss in the fluid increases, thereby increasing the pressure difference the fluid applies to the moving ring 28. Once the force acting on the moving ring 28 becomes greater than the opposing force exerted by the springs 38, the springs become compressed. The moving ring 28 is then moved in translation downstream and slides on the guide rods 32. A bypass passage for the gas is thus opened around the porous plate 10, thereby enabling continuity to be ensured in gas delivery.

In order to avoid a phenomenon of self-sustained oscillations in the moving ring 28 that would have a harmful effect on the quality of metering, the ring advantageously includes at least one adjustable abutment element 40 enabling the bypass passage to be held open in the event of the porous plate 10 becoming clogged.

This abutment element 40 may be constituted, for example, by a folded tongue carrying studs that are designed to come to bear against a downstream face of the porous plate 10 when the moving ring 28 moves in translation in the downstream direction.

In order to avoid the phenomenon of self-sustaining oscillations, any other damper system associated with the springs 38 could also be suitable.

In the same manner as for the preceding embodiment, it is possible to adjust the distance between the perforated plate 8 and the porous plate 10 by acting on the length of fastener rods 30. In the normal configuration of use of the conditioner, this distance lies in the range 5 mm to 25 mm, for example, and is preferably about 10 mm.

The force retaining the moving ring 28 around the porous plate 10 may also be adjusted by appropriately setting the springs 38, for example as a function of the diameter of the pipe and of the level of porous material clogging that can be tolerated.

There is no need for the elements of the conditioner 2' in this embodiment to possess ferromagnetic characteristics. They can thus be made out of any type of material capable of withstanding the pressure of the fluid.

In addition, the intermediate mode of operation described in association with the preceding embodiment can also apply to the conditioner 2'. In such a configuration (not shown in the figures), the ring placed around the porous plate is held stationary relative thereto. The ring is held at a certain distance from the porous plate, e.g. by means of the tongue having studs so that the bypass circuit is permanently open. As a result, in the absence of the porous material becoming clogged, a substantial portion of the fluid flow passes through the porous plate while the remaining portion of the flow passes via the bypass circuit. In the event of the porous material becoming clogged, the entire fluid flow passes via the bypass circuit so as to ensure continuity of the fluid flow.

Figure 5:
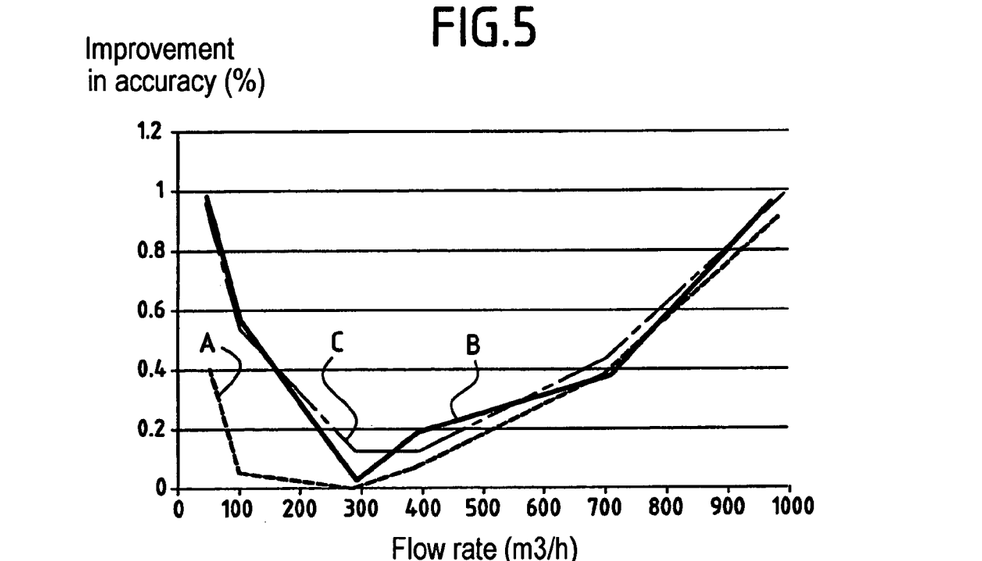
FIG. 5 plots curves giving increase in accuracy for different configurations of the conditioner of the invention.

The effectiveness of a conditioner having a bypass circuit as described in the above two embodiments has been tested in several configurations. FIG. 5 thus plots a curve giving increase in accuracy (as a percentage) for a conditioner as a function of gas flow rate (in cubic meters per hour) passing through the conditioner. The increase in accuracy represents the difference between the error obtained without the conditioner and the error obtained with the conditioner.

In FIG. 5, curve A corresponds to a flow conditioner having no bypass circuit, while curves B and C correspond to conditioners provided with a bypass circuit in the normal-use configuration (i.e. without the porous material being clogged). For curve B, the porous plate was about 10 mm away from the perforated plate, whereas for curve C, the distance between the porous and perforated plates was set at about 20 mm.

It can be seen from the curves that adding a bypass circuit does not degrade the performance of the flow conditioner, but on the contrary that it improves it. The positioning of the porous plate 10 mm or at 20 mm from the perforated plate does not appear to have significant influence on the effectiveness of the conditioner.

Figure 6:
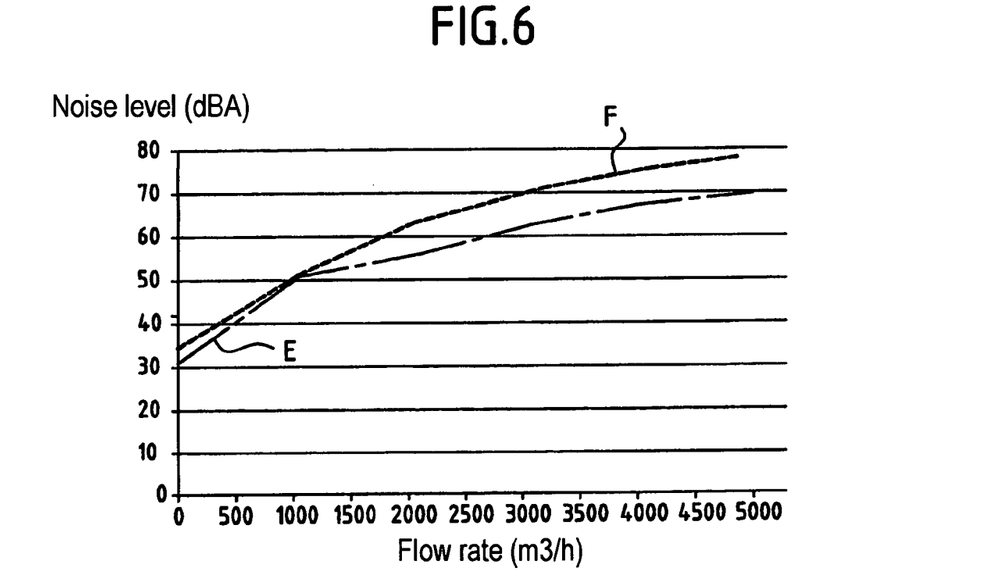
FIG. 6 plots curves giving the noise level of various configurations of the conditioner of the invention.

The noise generated by such a conditioner having a bypass circuit has also been tested. FIG. 6 thus plots the curve for noise level (in decibels A (dBA)) for a conditioner as a function of the gas flow rate (in cubic meters per hour) passing through the conditioner. Measurements were performed in an anechoic chamber at a distance of 1 meter (m) from the pipe.

In FIG. 6, curves E and F correspond to conditioners provided with a bypass circuit. For curve E, the conditioner was tested in its normal-use configuration (i.e. in the absence of the porous material being clogged), whereas for curve F, the porous material of the conditioner was clogged and the bypass circuit was open.

From these curves, it can be seen that in its open configuration (curve F), the presence of the bypass circuit increases the noise level very slightly compared with the normal utilization configuration (curve E). Nevertheless, it should be observed that this sound level does not exceed 80 dBA which corresponds to a noise level that is widely acceptable.

These tests show that adding a bypass circuit to the conditioner does not degrade its efficiency in any way, and can even improve it under certain circumstances.

What is claimed is:

1. A flow conditioner for a fluid transport pipe, the conditioner comprising a substantially tubular main body forming a support, at least one flow rectifier comprised of a perforated plate disposed inside the main body essentially perpendicularly to its longitudinal axis XX', and a porous plate disposed inside the main body upstream from the flow rectifier arid parallel thereto, wherein the elements of the conditioner are disposed in such a manner that a substantial fraction of the fluid flow passes through the flow rectifier and the porous plate in the absence of the porous plate becoming clogged, wherein the conditioner further includes a bypass circuit for ensuring continuity of fluid flow in the event of said porous plate becoming clogged, further comprising a stationary element and a moving element disposed inside the main body, the moving element being in contact with the stationary element in the absence of the porous plate becoming clogged, and being suitable for being moved in axial translation in a downstream direction relative to the stationary element so as to enable a bypass passage for the fluid in the event of said porous plate becoming clogged, means for holding the moving element in contact with the stationary element in the absence of the porous plate becoming clogged, and means for allowing the moving element to move in translation relative to the stationary element in the event of said porous plate becoming clogged, wherein the moving element is a support ring for supporting the porous plate, having an outside diameter smaller than an inside diameter of the main body, and the stationary element is a ring disposed inside the main body upstream from the porous plate, parallel thereto, and having an inside diameter smaller than the outside diameter of the moving ring.

2. A conditioner according to claim 1, including means for producing a magnetic attraction force to hold the moving ring against the stationary ring.

3. A conditioner according to claim 2, wherein the stationary ring includes at least one permanent magnet, and wherein the moving ring is essentially constituted by at least one ferromagnetic element.

4. A conditioner according to claim 3, wherein the stationary ring has a plurality of permanent magnets of samarium-cobalt alloy regularly distributed around its entire circumference.

5. A conditioner according to claim 1, wherein the moving ring includes at least one guide rod extending axially upstream and co-operating with a corresponding hole formed through the stationary ring so as to allow the moving ring to move in axial translation relative to the stationary ring.

6. A conditioner according to claim 5, wherein each guide rod is provided with an adjustable abutment element for coming into abutment against an upstream face of the stationary ring.

7. A conditioner according to claim 1, wherein the porous plate presents a thickness of about 10 mm and is made of a nickel-chromium alloy.

8. A conditioner according to claim 1, wherein the distance between the flow rectifier and the porous plate in the absence of the porous plate becoming clogged lies in the range 5 mm to 25 mm, approximately.

9. A conditioner according to claim 1, wherein the fluid is a gaseous fluid.

10. A flow conditioner for a fluid transport pipe, the conditioner comprising a substantially tubular main body forming a support, at least one flow rectifier comprised of a perforated plate disposed inside the main body essentially perpendicularly to its longitudinal axis XX', and a porous plate disposed inside the main body upstream from the flow rectifier and parallel thereto, wherein the elements of the conditioner are disposed in such a manner that a substantial fraction of the fluid flow passes through the flow rectifier and the porous plate in the absence of the porous plate becoming clogged, wherein the conditioner further includes a bypass circuit for ensuring continuity of fluid flow in the event of said porous plate becoming clogged, further including a stationary element and a moving element disposed inside the main body, the moving element being in contact with the stationary element in the absence of the porous plate becoming clogged, and being suitable for being moved in axial translation in a downstream direction relative to the stationary elements so as to enable a bypass passage for the fluid in the event of said porous plate becoming clogged, wherein the stationary element is constituted by the porous plate having an outside diameter less than an inside diameter of the main body, and the moving element is a ring disposed around the porous plate between the outside diameter of the porous plate and the inside diameter of the main body, and further comprising means for holding the moving element in contact with the stationary element in the absence of the porous plate becoming clogged, and means for allowing the moving element to move in translation relative to the stationary element in the event of said porous plate becoming clogged.

11. A conditioner according to claim 10, wherein the flow rectifier includes at least one guide rod extending axially upstream and co-operating with a corresponding hole formed through the moving ring so as to allow said moving ring to move in axial translation relative to the porous plate.

12. A conditioner according to claim 11, wherein each guide rod is provided with a spring interposed between the flow rectifier and the moving ring so as to hold said moving ring around the porous plate.

13. A conditioner according to claim 10, wherein the moving ring includes at least one adjustable abutment element for holding the bypass passage open in the event of the porous plate becoming clogged.

* * * * *

UNITED STATES PATENT AND TRADEMARK OFFICE
CERTIFICATE OF CORRECTION

PATENT NO. : 7,370,675 B2  Page 1 of 1
APPLICATION NO. : 11/054697
DATED : May 13, 2008
INVENTOR(S) : Julien Cancade et al.

It is certified that error appears in the above-identified patent and that said Letters Patent is hereby corrected as shown below:

Column 4, line 39, "The," should read --The--; and

Column 7, claim 1, line 66, "arid" should read --and--.

Signed and Sealed this

Twenty-eighth Day of October, 2008

JON W. DUDAS
*Director of the United States Patent and Trademark Office*